E. G. Lamson,
Table Fork.
Nº 62,640. Patented Mar. 5, 1867.
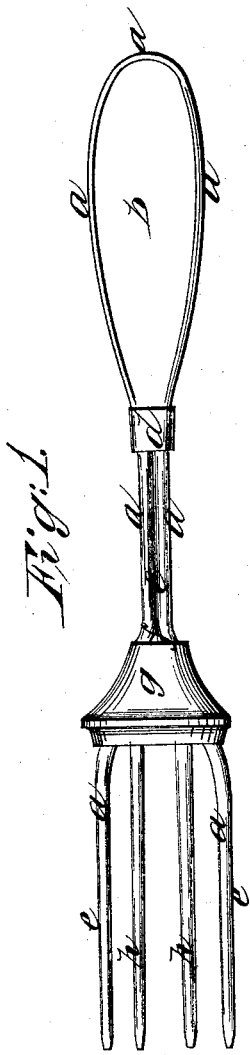
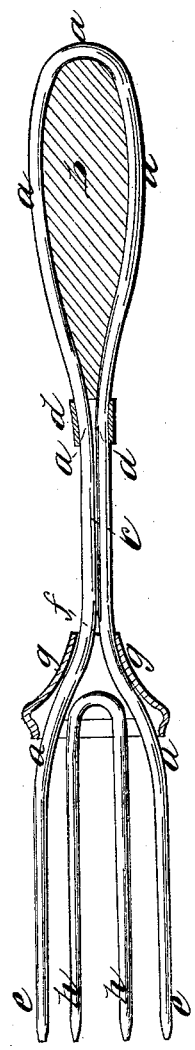
Witnesses:
Jnº D. Patten
T. J. Chamberlain
Inventor:
E. G. Lamson,
By atty A. B. Stoughton.

United States Patent Office.

EBENEZER G. LAMSON, OF SHELBURNE FALLS, MASSACHUSETTS.

*Letters Patent No. 62,640, dated March 5, 1867.*

IMPROVEMENT IN TABLE FORKS.

*The Schedule referred to in these Letters Patent and making part of the same.*

TO ALL WHOM IT MAY CONCERN:

Be it known that I, EBENEZER G. LAMSON, of Shelburne Falls, in the county of Franklin, and State of Massachusetts, have invented a new and useful improvement in the manner of making Table Forks of Wire; and I do hereby declare the following to be a full, clear, and exact description of the manner of doing the same, reference being had to the accompanying drawings, making a part of this specification, in which—

Figure 1 represents a finished fork.

Figure 2 represents one of the ferrules in section, to show the position of the tines in it.

My invention consists in making table forks out of wire, and so that the wire shall constitute the shank of the fork, and the means of uniting the fork to its handle.

To enable others skilled in the art to make and use my invention, I will proceed to describe the same with reference to the drawings.

I take a piece of steel wire, $a$ $a$, and by means of formers, bend or curve it around the handle $b$ from end to end. The handle $b$, which may be of wood, horn, bone, ivory, pearl, or other suitable material, has a groove cut around it longitudinally, into which the wire sinks so as to hold it firmly. The wire having been drawn tightly around the handle, is brought together at the end nearest the tines, and is there fastened by pinning, twisting, soldering, or by a ferrule, $d$, the ends of the wire projecting still further, so as to form the shank $c$, and two of the tines $e$. From the ferrule $d$, or other fastening at that point, the wires project in a straight or curved line or lines, at pleasure, parallel or twisted together, and for a suitable distance, when they separate, as at $f$, and are formed into two tines, $e$. These two tines may constitute a two-tined fork; or, if more than two tines are required, then the two tines $e$ may constitute the outer ones of the series; and when intermediate tines, $h$, are used, a ferrule, $g$, is put around the place where the tines separate, and by a blow from a drop or punch press, with dies of suitable shape, and while the tines are held in their proper places, the metal is set down around the wires, making the tines and ferrule or bolster firmly clamped together. Or the ferrule $g$ may be filled with solder when heated, or may be made in two pieces and pinned together, and fastened firmly by a drop or power press. Or, instead of a ferrule, fine wire may be wound tightly around the large wire, and the fork may be so constructed that the same device which holds the tines together shall also hold the wire firmly around the handle. When two intermediate tines are used, they may be made of one piece, as being stronger and more easily and firmly fastened in; or they may be in separate pieces, as a single tine would be in making a three-tine fork. There are several important advantages gained in constructing a table fork of wire, among which may be mentioned cheapness of construction; their superior strength and durability as compared with punched-out forks; the tines are smoother and are more readily cleaned; there is no loss of metal in making the fork, whilst in ordinary forks all the metal that is punched out between the tines and elsewhere is lost; there is no possibility of the handle and fork separating, as in ordinary forks.

What I claim as my invention, and desire to secure by Letters Patent, is—

A table fork made of wire, substantially as herein described.

E. G. LAMSON.

Witnesses:
HENRY WARDNER,
L. W. HAWLEY.